United States Patent [19]

Watson et al.

[11] Patent Number: 5,837,049
[45] Date of Patent: *Nov. 17, 1998

[54] TREATED INORGANIC SOLIDS

[75] Inventors: Colin Lloyd Watson, Hurworth Place, England; Peter James Allen, Ridgeley, Australia

[73] Assignee: Tioxide Group Services Limited, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 957,411

[22] Filed: Oct. 23, 1997

Related U.S. Application Data

[63] Continuation of Ser. No. 539,899, Oct. 6, 1995, abandoned.

[30] Foreign Application Priority Data

Oct. 14, 1994 [GB] United Kingdom .................... 9420707
Aug. 5, 1995 [GB] United Kingdom .................... 9516106

[51] Int. Cl.$^6$ ................................ C08C 3/08; C08J 3/20; C08K 3/32
[52] U.S. Cl. .................. 106/427; 106/420; 106/423; 106/429; 106/432; 106/447; 106/450; 106/453; 106/460; 106/462; 106/465; 106/468; 106/471; 106/491; 106/503; 524/130
[58] Field of Search ...................................... 106/420, 423, 106/427, 429, 432, 447, 450, 453, 460, 462, 465, 468, 471, 491, 503; 524/130

[56] References Cited

U.S. PATENT DOCUMENTS

| | | |
|---|---|---|
| 4,174,340 | 11/1979 | Luders et al. . |
| 4,209,430 | 6/1980 | Weber . |
| 4,254,073 | 3/1981 | Hart . |
| 4,781,982 | 11/1988 | Musselman et al. . |
| 4,889,879 | 12/1989 | Seinera et al. ............................. 524/13 |

FOREIGN PATENT DOCUMENTS

| | | |
|---|---|---|
| 0 073343 | 3/1983 | European Pat. Off. . |
| 0 134949 | 3/1985 | European Pat. Off. . |
| 0 477622 | 4/1992 | European Pat. Off. . |
| 0 496150 | 7/1992 | European Pat. Off. . |
| 560-70053 | 6/1981 | Japan . |
| 571-68954 | 10/1982 | Japan . |
| 591-70130 | 9/1984 | Japan . |
| 591-70131 | 9/1984 | Japan . |
| 601-90480 | 9/1985 | Japan . |
| 401-3780 | 1/1992 | Japan . |
| 0661741 | 8/1987 | Switzerland . |
| 1006460 | 3/1983 | U.S.S.R. . |
| 0 763367 | 12/1956 | United Kingdom . |
| 0 924584 | 4/1963 | United Kingdom . |
| 1 116721 | 6/1968 | United Kingdom . |
| 1 121367 | 7/1968 | United Kingdom . |
| 1 288581 | 9/1972 | United Kingdom . |

OTHER PUBLICATIONS

Kirk–Opthmer Encyclopedia of Chemical Technology, p. 808, 1982.

*Primary Examiner*—David Brunsman

[57] ABSTRACT

A treated inorganic solid comprises particulate inorganic material the particles of which are coated with an alkylphosphonic acid or ester thereof, the alkylphosphonic acid containing 6 to 22 carbon atoms. The particulate material is usually a pigment, extender or filler which is treated by mixing with the alkylphosphonic acid or ester for example in an aqueous dispersion or during a process step such as milling. The treated inorganic solid is particularly useful for preparing polymer compositions such as masterbatches.

19 Claims, No Drawings

TREATED INORGANIC SOLIDS

This is a continuation of application Ser. No. 08/539,899 filed on Oct. 6, 1995, now abandoned.

This invention relates to treated inorganic solids and in particular to particulate inorganic solids which have been treated with certain organophosphorus compounds.

Pigmented and/or filled polymeric compositions are frequently produced by mixing virgin polymer with a concentrated blend of pigment or filler and polymer known as a masterbatch. In the production of masterbatches and other filled polymer compositions it is important to ensure that pigment or filler and polymer are efficiently mixed in an economical process. Frequently, this is achieved by surface treatment of the pigment or filler particles.

It is an object of the present invention to provide pigments and fillers in a novel form and which are particularly suitable for the preparation of polymeric masterbatches.

According to the invention a treated inorganic solid comprises particulate inorganic material, the particles of which are coated with an alkylphosphonic acid or an ester of an alkylphosphonic acid wherein the alkylphosphonic acid contains from 6 to 22 carbon atoms.

The particles of inorganic material are coated with an alkylphosphonic acid or an ester thereof which can be represented by the formula:

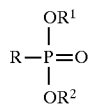

in which R is an alkyl group or a cycloalkyl group containing 6 to 22 carbon atoms and $R^1$ and $R^2$ are each hydrogen, an alkyl group, a cycloalkyl group, an aryl group or an aralkyl group.

Preferably, R contains from 6 to 14 carbon atoms and is a straight chain alkyl group. However, branched chain alkylphosphonic acids and their esters are suitable. Phosphorus compounds of use include n-octylphosphonic acid and its esters, n-decylphosphonic acid and its esters, 2-ethylhexylphosphonic acid and its esters and camphyl phosphonic acid and its esters.

When $R^1$ and $R^2$ are both hydrogen the above formula represents an alkylphosphonic acid and when at least one of $R^1$ and $R^2$ is a hydrocarbyl group the formula represents an ester of an alkylphosphonic acid. In the case of esters, preferably, $R^1$ and $R^2$ contain up to 10 carbon atoms and more preferably up to 8 carbon atoms (i.e. the ester is an ester of an alcohol containing up to 10, and preferably up to 8 carbon atoms). $R^1$ and $R^2$ can be different but frequently are the same. Suitable esters include ethyl esters, butyl esters, octyl esters, cyclohexyl esters and phenyl esters.

Suitable particulate inorganic material for preparing the treated material of this invention include those materials which are used as pigments, fillers and extenders. Examples include titanium dioxide, zinc oxide, antimony pigments, barium pigments, calcium pigments, zirconium pigments, chromium pigments, iron pigments, lead pigments, zinc sulphide, lithopone, silica, silicates such as talc and mica, aluminium oxides and hydroxides, magnesium oxides and hydroxides, sulphates such as gypsum and barium sulphate, carbonates such as calcium carbonate, borates such as zinc borate or clays.

In a particularly preferred embodiment of the invention the inorganic material is titanium dioxide. The titanium dioxide can be any form of titanium dioxide which is suitable for use in masterbatches or similar polymer compositions. One form of titanium dioxide is included in the composition for the purpose of producing a white composition and/or to improve opacity. This form is generally known as pigmentary titanium dioxide. However, included within the scope of the invention is titanium dioxide which is often called "transparent" titanium dioxide on account of the fact that, due to its particle size, the attenuation of visible light is very low. This form of titanium dioxide has a high attenuation for UV light and is therefore added to plastics compositions to provide protection from UV light. The titanium dioxide can be prepared by any of the well known processes such as the "sulphate" process or the "chloride" process and may be in the anatase or rutile crystal form although rutile titanium dioxide is preferred.

In view of the fact that a principal use of the treated inorganic solids of the invention is the formation of masterbatch compositions for pigmented or filled plastics, the particle size of the inorganic solids will normally be such that the material is suitable for this purpose. Normally, the average particle size of the inorganic solids is in the range 0.1 micrometre to 20 micrometre. When the inorganic material is a material which is normally considered to be a filler or an extender, for example, carbonates, alumina trihydrate and clays, the average particle size is generally in the range 0.5 micrometre to 20 micrometre and preferably in the range 0.5 micrometre to 10 micrometres. For inorganic materials generally considered to be pigments the average particle size is normally in the range 0.1 micrometre to 0.5 micrometre and preferably in the range 0.2 micrometre to 0.4 micrometre.

Generally, when pigmentary titanium dioxide in the rutile form is used the average crystal size is from 0.2 to 0.3 micrometre and when pigmentary titanium dioxide in the anatase form is used the average crystal size is from 0.1 to 0.35 micrometre.

When the so-called "transparent" titanium dioxide is used it generally has an average primary particle size of from 0.01 to 0.15 micrometre. Where the particles are substantially spherical this size will normally be taken to represent the diameter. However, non-spherical particles can be used and in such cases the size refers to the largest dimension. One preferred product is acicular and has a ratio of largest dimension to shortest dimension of from 8:1 to 2:1. For "transparent" titanium dioxide an average primary particle size within the range 0.01 to 0.03 micrometre is preferred when the particles are substantially spherical and for acicular particles the average largest dimension of the primary particles is preferably within the range 0.02 to 0.1 micrometre.

A further inorganic solid of use in the invention is zinc oxide which has an average primary particle size in the range 0.01 to 0.1 micrometre. Zinc oxide having this particle size is frequently used in polymer compositions to provide protection from UV light in a similar manner to "transparent" titanium dioxide.

The particles of inorganic solid can be uncoated or may be coated with an inorganic oxide or hydrous oxide before being coated with the alkylphosphonic acid or ester. The inorganic oxides or hydrous oxides which can be used are those which are commonly utilised in pigment manufacture, particularly titanium dioxide pigment manufacture, and include oxides or hydrous oxides of aluminium, calcium, magnesium, iron, silicon, zirconium and titanium.

The particles of inorganic solid of the invention are described as coated with an alkylphosphonic acid or an ester thereof but this does not necessarily imply complete or uniform coverage of the particle surface. Generally, the amount of alkylphosphonic acid or ester present as a coating is expressed in terms of the phosphorus content of the coated particles and is from 0.1 to 5.0 per cent phosphorus by weight with respect to dry weight of solid particles. The preferrred amount depends to some extent upon the average particle size of the inorganic solid but, generally, from 0.1 to 1.0 per cent phosphorus by weight is preferred and more preferably the amount present is from 0.3 to 0.8 per cent phosphorus by weight with respect to dry weight of solid particles.

When pigmentary titanium dioxide is employed the preferred amount of alkylphosphonic acid or ester is from 0.1 to 1.0 per cent phosphorus by weight with respect to $TiO_2$ and, more preferably, this amount is 0.3 to 0.8 per cent phosphorus by weight with respect to $TiO_2$. When "transparent" titanium dioxide or zinc oxide having an average particle size in the range 0.01 to 0.1 micrometre is used, the amount of organophosphorus compound used is, generally, larger. Preferably, the amount present is from 2.0 to 4.0 per cent phosphorus by weight with respect to $TiO_2$ or ZnO.

Any process which produces a relatively uniform coating of the alkylphosphonic acid or ester on the surface of the particles of inorganic solid can be used to prepare the product of the invention and the chosen method will depend to some extent upon the physical form of the organophosphorus compound, the particular inorganic solid and the final application for the product.

One appropriate method is to mix an aqueous dispersion or slurry of the inorganic solid with the alkylphosphonic acid or ester. When the alkylphosphonic acid or ester is a liquid it can be mixed with the aqueous dispersion directly or in solution in a suitable solvent such as an alcohol. Alternatively, the alkyl phosphonic acid or ester is formed into an aqueous emulsion by rapid stirring with water, if necessary in the presence of an emulsifier, and this emulsion is thoroughly mixed with the aqueous dispersion of inorganic solid. When the alkylphosphonic acid or ester is a solid it can be dissolved in a suitable solvent and added to an aqueous dispersion of the inorganic solid as a solution or an emulsion. When one of these methods is used for pigmentary titanium dioxide it is convenient to use the aqueous slurry of titanium dioxide normally produced on a pigment plant as a product of, for example, a process in which titanium dioxide has been coated with an inorganic oxide or hydrous oxide. The treated solid is subsequently separated and dried by the conventional methods used in the pigment and filler industries.

It is not necessary to disperse the inorganic solid during the treatment process. The alkylphosphonic acid or ester can be added to the solid by the aforementioned methods whilst the solid is being treated by techniques conventionally used in its preparation or use, for example during filtration or in the course of spray drying.

Alternatively, it is convenient to carry out the coating process whilst the inorganic solid is being milled since, frequently, pigments and fillers are subjected to a milling step in, for example, a microniser or a grinding mill before being finally packed. The alkylphosphonic acid or ester is mixed with the inorganic solid which is fed to the mill and the act of milling is believed to produce a coating of the alkylphosphonic acid or ester on the solid particles. The alkylphosphonic acid or ester may be formed into an aqueous emulsion or dissolved in a solvent such as an alcohol, for example methanol, ethanol or isopropanol, and the resulting solution or emulsion sprayed onto the powdery solid feed to the mill or the alkylphosphonic acid or ester may be simply added to the powdery feed. This last technique is especially suitable for solid alkylphosphonic acids or esters which are caused to melt during the milling process by the heat generated in milling.

The treated solids of the invention are very useful in the preparation of polymer masterbatches and, in an alternative coating process, the particulate inorganic solid can be coated with the alkylphosphonic acid or ester during the formation of a masterbatch. For example, it is normal to initially mix the dry ingredients for a masterbatch in an intensive mixer such as a Henschel mixer. When inorganic solid, alkylphosphonic acid or ester and polymer are mixed in such a mixer, it is believed that the alkylphosphonic acid or ester effectively forms a coating on the surface of the inorganic particles. Inorganic solids which have been treated in this manner are included within the scope of this invention.

The proportion of inorganic pigment or filler present in polymer compositions such as masterbatches which can be prepared using the treated particles of this invention depends upon the intended use for the composition. Generally, a masterbatch contains 40 to 80 per cent by weight of the coated inorganic pigment or filler and, preferably, the amount of coated particulate solid is from 50 to 75 per cent by weight. Masterbatches containing "transparent" titanium dioxide or zinc oxide having an average particle size in the range 0.01 to 0.1 micrometre generally contain less inorganic solid. Typically the amount present is from 5 to 40 per cent by weight and preferably is from 10 to 20 per cent by weight.

A number of polymers can be used to prepare the compositions and useful polymers include polyolefines, PVC, styrenic polymers such as polystyrene and acrylonitrile-butadiene-styrene polymers, polyamides, polycarbonates and polyesters. Preferably the polymer is polyethylene or polypropylene.

As already stated above, the pigment or filler and polymer are frequently mixed before compounding in an intensive mixer although they can also be separately added to a compounder. Typical compounders include Banbury mixers, single and twin screw extruders and hybrid continuous mixers. When the ingredients are separately added to the compounder they may be initially mixed within the compounder in, for example, a screw feeder. The heat within the compounder, which is usually generated by the energy of mixing, causes the polymer to melt and allows intimate mixing of polymer and pigment or filler particles. The temperature at which the compounder operates depends upon the type of compounder. For example, Banbury mixers typically operate at temperatures from 100° C. to 200° C. and twin screw mixers typically operate from 150° C. to 300° C.

If necessary, the composition is calendered or extruded to form pellets after the compounding stage.

Compared to previously known pigments and fillers, the pigments and fillers of the invention have a low oil demand which aids the processing of a masterbatch. Usually the loading or charge torque for a masterbatch utilising the inventive pigment or filler is lower than in prior known processes which results in a lower energy consumption. It is also possible to increase the throughput of a compounder when the pigment or filler of this invention is substituted for a known pigment or filler.

The invention is illustrated by the following examples.

EXAMPLE 1

500 g of rutile titanium dioxide were placed in a pan pelletizer (40 cm bowl inclined at 45°) rotating at 28 rpm. 100 ml of a solution of diethyl n-decane phosphonate (3.5 g)

in methanol was sprayed as a fine mist onto the sample in bursts of several seconds with the aid of a spray bottle. The damp pigment was then dried overnight in an oven at 105° C. and used without further treatment.

A titanium dioxide pigment commercially available as Tioxide R-FC5 was used as a reference pigment.

Oil absorption values at the ball point were determined using dioctyl phthalate according to the procedure of ASTM D281- Determination of oil absorption values.

A masterbatch containing 70 wt % titanium dioxide in Micropol LP7 LDPE was prepared using a Haake Rheocord 90 internal mixer fitted with a Rheomix 600 mixing head and Banbury rotors. Weighed portions of titanium dioxide and polymer were lightly mixed before adding to the mixer operating under the following conditions; Rotor speed 125 rpm, bowl temperature 65° C., 5 kg weight. Maximum torque values during the loading peak were recorded as a charge torque. Results are shown in Table 1 below.

EXAMPLE 2

30 kg of titanium dioxide pigment was slurried to approximately 500 grams per litre using a Silverson mixer and placed in a spray drier feed tank. 140 g of octyl phosphonic acid prepared as a 60% emulsion in water was added to the vessel and mixed for 5 minutes using a recirculating pump before spray drying.

The spray dried material was micronised on a fluid energy mill and tested for oil absorption and charge torque as described in Example 1. Results are shown in Table 1.

EXAMPLE A (Comparative)

500 g of rutile titanium dioxide were treated by the technique of Example 1 except that 3.5 g of dibutyl butyl phosphonate were used in place of the diethyl n-decane phosphonate of Example 1. Oil absorption and charge torque values for the treated pigment are shown in Table 1.

EXAMPLE B (Comparative)

500 g of rutile titanium dioxide were treated by the technique of Example 1 except that 3.5 g of vinyl phosphonic acid were used in place of the diethyl n-decane phosphonate of Example 1. Oil absorption and charge torque values for the treated pigment are shown in Table 1.

TABLE 1

| Pigment | Oil absorption (cm³/100 g) | Charge torque (Nm) at 90 g charge weight | Charge torque (Nm) at 95 g charge weight |
| --- | --- | --- | --- |
| R-FC5 | 21.0 | 52.0 | 71.0 |
| Example 1 | 17.3 | 23.0 | 48.5 |
| Example 2 | 16.9 | 23.5 | 38.1 |
| Example A | 45.0 | 62.2 | N/D |
| Example B | 35.5 | 68.9 | N/D |

N/D = not done (the torque was too high for safe operation of the Rheocord mixer)

EXAMPLE 3

500 g portions of calcium carbonate (Hydrocarb from Croxton and Garry) were placed in a pan pelletizer (40 cm bowl inclined at 45°) rotating at 28 rpm. 100 ml of a solution of octyl phosphonic acid (2.5 g or 3.5 g) in methanol was sprayed as a fine mist onto the calcium carbonate in bursts of several seconds with the aid of a spray bottle. The damp calcium carbonate was then dried overnight in an oven at 105° C. and used without further treatment.

Oil absorption values at the ball point were determined using dioctyl phthalate according to the procedure of ASTM D28 1-Determination of oil absorption values.

Masterbatches containing 50% of this treated calcium carbonate and, for comparison, untreated calcium carbonate in Micropol LP7 LDPE were prepared using a Haake Rheocord 90 internal mixer fitted with a Rheomix 600 mixing head and Banbury rotors. Weighed portions of calcium carbonate and polymer were lightly mixed before adding to the mixer operating under the following conditions; rotor speed 125 rpm, bowl temperature 65° C., 5 kg weight. Maximum torque values during the loading peak were recorded as a charge torque. Results are shown in Table 2 below.

TABLE 2

| Calcium carbonate treatment | Oil absorption (cm³/100 g) | Charge weight (g) | Charge torque (Nm) |
| --- | --- | --- | --- |
| untreated | 36.5 | 62 | 36.4 |
| 0.5% OPA | 32.3 | 62 | 11.6 |
| 0.5% OPA | 32.3 | 66 | 20.6 |
| 0.5% OPA | 32.3 | 68 | 25.8 |
| 0.5% OPA | 32.3 | 72 | 50.4 |
| 0.7% OPA | 29.8 | 70 | 35.3 |
| 0.7% OPA | 29.8 | 72 | 47.6 |

OPA = octyl phosphonic acid

EXAMPLE 4

500 g portions of alumina trihydrate were treated with octyl phosphonic acid in a similar manner to the calcium carbonate of Example 3. Oil demand and maximum torque values were measured as in Example 3 and are given in Table 3 below.

TABLE 3

| Alumina trihydrate treatment | Oil absorption (cm³/100 g) | Charge weight (g) | Charge torque (Nm) |
| --- | --- | --- | --- |
| untreated | 67.3 | 62 | 70.9 |
| 0.5% OPA | 37.5 | 62 | 31.5 |
| 0.5% OPA | 37.5 | 66 | 52.1 |
| 0.7% OPA | 35.8 | 66 | 40.8 |
| 0.7% OPA | 35.8 | 68 | 53.9 |

OPA = octyl phosphonic acid

EXAMPLE 5

500 g portions of gypsum, produced as a by-product from sulphuric acid generated during the production of titanium dioxide were treated with octyl phosphonic acid in a similar manner to the calcium carbonate of Example 3. Oil demand and maximum torque values were measured as in Example 3 and are given in Table 4 below.

TABLE 4

| Gypsum treatment | Oil absorption (cm³/100 g) | Charge weight (g) | Charge torque (Nm) |
| --- | --- | --- | --- |
| untreated | 68.8 | 62 | 62.0 |
| 0.5% OPA | 53.5 | 62 | 27.2 |
| 0.5% OPA | 53.5 | 66 | 50.4 |
| 0.7% OPA | 54.8 | 66 | 48.3 |

OPA = octyl phosphonic acid

We claim:

1. A treated inorganic solid comprising particulate titanium dioxide or zinc oxide, the particles of which are coated with a composition consisting essentially of an organophosphorus compound selected from the group consisting of alkylphosphonic acids and esters of alkylphosphonic acids wherein the alkylphosphonic acid contains from 8 to 22 carbon atoms.

2. A treated inorganic solid according to claim 1 in which the particulate titanium dioxide or zinc oxide is coated with an alkylphosphonic ester which is an ester of an alcohol containing up to 10 carbon atoms.

3. A treated inorganic solid according to claim 1 in which the titanium dioxide or zinc oxide have a low attenuation for visible light and a high attenuation for ultraviolet light.

4. A treated inorganic solid according to claim 1 in which the particulate titanium dioxide has an average particle size in the range 0.1 micrometre to 20 micrometre.

5. A treated inorganic solid according to claim 1 in which the particulate titanium dioxide is a pigment having an average particle size in the range 0.1 micrometre to 0.5 micrometre.

6. A treated inorganic solid according to claim 5 in which the pigment is rutile titanium dioxide having an average crystal size from 0.2 micrometre to 0.3 micrometre.

7. A treated inorganic solid according to claim 5 in which the pigment is anatase titanium dioxide having an average crystal size from 0.1 micrometre to 0.35 micrometre.

8. A treated inorganic solid according to claim 1 in which the titanium dioxide has an average primary particle size of from 0.01 micrometre to 0.15 micrometre.

9. A treated inorganic solid according to claim 1 in which the zinc oxide has an average primary particle size in the range of 0.01 micrometre to 0.1 micrometre.

10. A treated inorganic solid according to claim 8 or 9 in which the organophosphorus compound is present in an amount equivalent to from 2.0 to 4.0 per cent by weight expressed as weight of phosphorus with respect to dry weight of titanium dioxide or zinc oxide particles.

11. A composition comprising a mixture of an organic polymer and a treated inorganic solid according to claim 8 or 9 in which the treated inorganic solid is present in an amount between 5 and 40 per cent by weight with respect to total weight of composition.

12. A treated inorganic solid according to claim 1 in which the particles of titanium dioxide or zinc oxide are provided with a coating of an inorganic oxide or hydrous oxide before being coated with the organophosphorus compound.

13. A treated inorganic solid according to claim 1 in which the organophosphorus compound is present in an amount equivalent to from 0.1 to 5.0 per cent by weight expressed as weight of phosphorus with respect to dry weight of titanium dioxide or zinc oxide particles.

14. A treated inorganic solid according to claim 13 in which the amount of organophosphorus compound is equivalent to from 0.1 to 1.0 per cent phosphorus by weight with respect to dry weight of titanium dioxide or zinc oxide.

15. A composition comprising a mixture of an organic polymer and a treated inorganic solid according to claim 1 in which the treated inorganic solid is present in an amount between 40 and 80 per cent by weight with respect to total weight of composition.

16. A method of treating particulate titanium dioxide or zinc oxide comprising forming an aqueous dispersion or slurry of said particulate titanium dioxide or zinc oxide, mixing said aqueous dispersion or slurry with an organophosphorus compound selected from the group consisting of alkylphosphonic acids and esters of alkylphosphonic acids wherein the alkylphosphonic acid contains from 8 to 22 carbon atoms and adding a polymer to the treated titanium dioxide or zinc oxide- containing aqueous dispersion or slurry.

17. A method according to claim 16 in which the aqueous dispersion or slurry is an aqueous dispersion or slurry of pigmentary titanium dioxide taken directly from a titanium dioxide pigment plant.

18. A method of treating an inorganic particulate material comprising mixing particulate titanium dioxide or zinc oxide with an organophosphorus compound selected from the group consisting of alkylphosphonic acids and esters of alkylphosphonic acids whilst the titanium dioxide or zinc oxide is being subjected to a treatment process selected from filtration, spray drying and milling wherein said alkylphosphonic acid contains from 6 to 22 carbon atoms.

19. A method according to claim 18 in which the organophosphorus compound is added to the particulate titanium dioxide or zinc oxide as an aqueous emulsion, dissolved in a solvent or as a solid as the titanium dioxide or zinc oxide is fed to a mill.

* * * * *